United States Patent [19]

Berthod

[11] 4,181,852

[45] Jan. 1, 1980

[54] SPARK SOURCE SPECTROGRAPHIC ANALYSIS PROCESS AND APPARATUS

[75] Inventor: Jacques Berthod, Saint Martin d'Heres, France

[73] Assignee: Commissariat a l'Energie Atomique, Paris, France

[21] Appl. No.: 789,328

[22] Filed: Apr. 20, 1977

[30] Foreign Application Priority Data

May 3, 1976 [FR] France ........ 76 13145

[51] Int. Cl.[2] ........ B01D 59/44

[52] U.S. Cl. ........ 250/286; 250/290; 250/293

[58] Field of Search ........ 250/286, 290, 293

[56] References Cited

U.S. PATENT DOCUMENTS

| | | | |
|---|---|---|---|
| 2,764,691 | 9/1956 | Hipple | 250/290 |
| 3,809,896 | 5/1974 | Schuy et al. | 250/286 |

*Primary Examiner*—Harold A. Dixon
*Attorney, Agent, or Firm*—Sughrue, Rothwell, Mion, Zinn and Macpeak

[57] ABSTRACT

The spark source spectrographic analysis process and apparatus utilizes an ion source with two electrodes connected to electrical excitation means making it possible to produce discharges between them and means for directing the ions formed in this source to a mass spectrograph, together with means which make it possible for the spectrograph only to analyze the ions produced by discharges having a given direction.

8 Claims, 4 Drawing Figures

SPARK SOURCE SPECTROGRAPHIC ANALYSIS PROCESS AND APPARATUS

BACKGROUND OF THE INVENTION

The present invention relates to a spark source mass spectrographic analysis process and to an apparatus for performing said process.

It is known that a mass spectrograph is an apparatus which produces ions from the substance to be analysed, after which it classifies them according to the mass ratio of their mass to their charge. It permits the very accurate determination of the mass of each of the ions formed and the counting of the number of ions of each type, thus making it possible to determine the composition of the substance.

In so called "spark source" apparatus the ion source has two small cylindrical electrodes in a metal cage which is brought to acceleration potential. A high voltage, generally an alternating voltage is applied between the electrodes to bring about the formation of a spark-type discharge. The ions produced by these discharges are extracted from the cage by an orifice and selected through a system of slits, and the latter, which is grounded is the object slit of the spectrograph where they are analysed and counted.

This method of analysis permits the simultaneous examination of all the elements lithium to uranium and the obtention of semi-quantitative results without a comparative standard. However, spark source mass spectrography only really gives precise quantitative results due to the lack of reproducibility of the results, whose standard deviation can sometimes exceed fifty percent.

To obviate this disadvantage apparatus have been proposed for checking the position of the electrodes in the ion source and for making the electrode spacing dependent either on the breakdown voltage or on the average current intensity in the circuit.

Although these methods have led to an improvement in the results they are still reproducible to only a limited extent and in any case they are difficult to perform.

By using the automatically released spark system previously described by the present applicant, that is to say a periodic sequence of damped discharges, the applicant has discovered that in this type of spectograph using an ion source with spark discharges the characteristics of the spectrograms obtained are dependent on the direction of said discharges. The applicant has in particular found that when these discharges have a direction such that the sparked electrode which is brought to the acceleration potential (that is to say connected to the cage) serves as an anode the relative intensities of the lines of the volatile elements and the multicharged ions are greater than those observed when the said electrode acts as the cathode. The lack of reproducibility of the spectra recorded with the prior art processes is explained by the fact that the number of discharges producing in one or other direction is not reproducible from one analysis to the next which gives the ionic beam composition a fluctuating character.

The applicant has also found that numerous advantages can be obtained by only performing the spectrographic analysis on the ions from discharges in one direction only. Firstly the purity of the spectrograms is improved and the analysis can be quantitative, secondly it is possible to control the relatively large number of polycharged ions (whose presence can either be favourable to the detection of certain elements or unfavourable when interference occurs with a line coming from monocharged ions) and finally when the discharge direction is such that the electrode brought to the acceleration potential is the anode the ionic current intensity is higher and the lines are finer than in the prior art.

BRIEF SUMMARY OF THE INVENTION

More specifically the object of the invention is a mass spark source spectrographic analysis process of the type in which ions are produced by means of sparking discharges between two electrodes, whereby the ions produced are directed towards a mass spectrograph where spectrography is performed and is characterised in that said spectrography is only performed on those ions produced by discharges having a given direction.

Preferably according to the present invention an electrical excitation is applied to the electrodes through a circuit such that the discharges have critical or supercritical damping.

According to a first variant of this process discharges are produced in both directions, the direction of each discharge is detected and the ions are directed towards the mass spectrograph to be analysed when the discharge has the desired direction, but they are deflected away and are not analysed when the discharge does not have the desired direction.

Preferably for the selection of ions coming from discharged having the desired direction a spectrography having a suitable suppressor plate is used which is normally polarised to the deflecting voltage. A voltage pulse of the same amplitude and opposite sign is formed and said voltage is applied to said suppressor plate when the discharge has the desired direction.

Preferably when one of the two electrodes of the ion source is brought to a continuous acceleration potential the direction of the discharges chosen for carrying out spectrography is that causing the electrode to serve as the anode.

In a second variant of the process only discharges having a given direction are produced, and spectrography is then carried out using all the thus formed discharges. To effect this a unipolar excitation is applied to the electrodes through a discharge circuit which is preferably at critical or supercritical damping. Preferably the electrode brought to continuous acceleration potential serves as the anode.

The invention also has for it's object a spark source mass spectrographic analysis apparatus for use with the process defined herein before and which comprises an ion source having two electrodes connected to electrical excitation means permitting the formation of discharges between them and means for directing the ions in this source towards a mass spectrographic and is characterised in that it also comprises means which make it possible for the spectrograph only to analyse those ions produced by discharges having a given direction.

Two variants of the apparatus according to the invention are possible. In the first the discharges take place in both directions and the apparatus comprises means for detecting the direction of the discharges which are able to supply a voltage which is applied to an ion beam deflecting electrode, whereby said voltage is such that the electrode deflects the ions resulting from the discharges not having the desired direction. Preferably the discharge direction detection means comprise a probe which is sensitive to the current circulating in the discharge circuit and a detection circuit of the direction of said current.

According to the second variant the ion source excitation means comprise a unipolar excitation generator and a unipolar discharge circuit, which is more specifically at critical damping.

BRIEF DESCRIPTION OF THE DRAWINGS

Other features and advantages of the present invention can be gathered from the following description of exemplified and nonlimitative embodiments with reference to the attached drawings wherein show.

DETAILED DESCRIPTION OF THE PREFERRED EMBODIMENTS

In the following description consideration is given to the case where only the positive ions are extracted from the ion source of the spectrograph.

Figure 1:
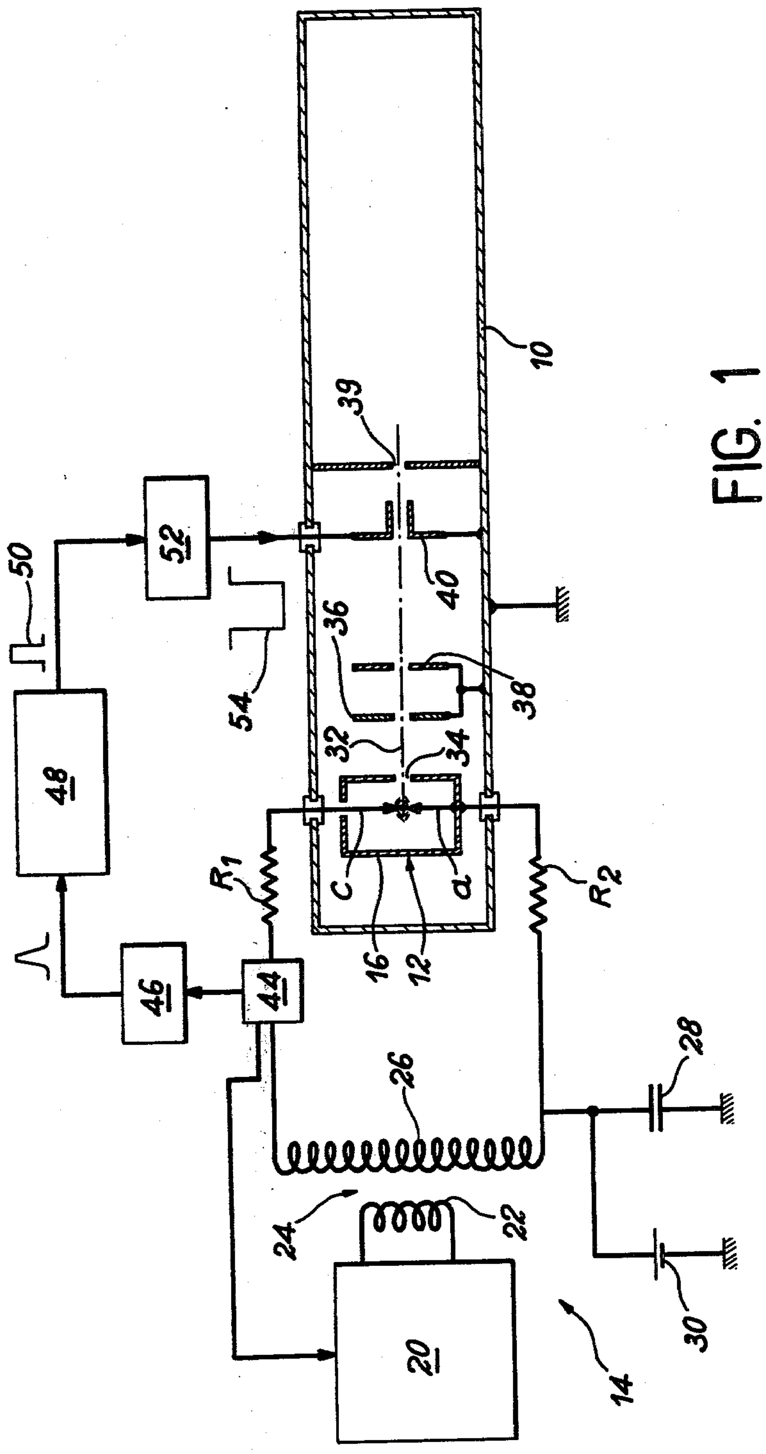
FIG. 1 is a schematic diagram of the apparatus according to the invention in it's first variant.

The apparatus shown in FIG. 1 comprises a spectrograph 10 supplied by an ion source 12 connected to electrical excitation means 14. Spectrograph 10 can be of any random known type. Ion source 12 is also known and comprises two electrodes a and c placed in a metallic cage 16. Electrode a is connected to metallic cage 16 and electrode c is insulated therefrom. The electrical excitation means 14 comprise a generator 20 connected to the primary 22 of a transformer 24 whose secondary is connected to the electrodes a and c of the ion source through two resistors $R_1$ and $R_2$. A capacitor 28 protects the D.C. voltage source.

The electrical excitation circuit of the source is not original per se in this connection reference can be made to the publication entitled "Discharge Current and Associated Ions in Radiofrequency Spark Source Mass Spectrometry" by J. Berthod published in "Advances in Mass Spectrometry," volume 6, published by "Applied Science Publishers Ltd, England" pages 421 to 427.

For reference purposes generator 20 can supply an A.C. voltage of frequency 500 kHz of peak-to-peak amplitude variable between 5 and 80 kV in the form of trains. When electrodes a and c are sufficiently close together for a spark to form between them a discharge current appears, whose variations are dependent on the electrical characteristics of the discharge circuit (resistance, inductance, capacitance). The trains of maximum duration 100 microseconds are interrupted by the discharge and the repetition frequency can be adjusted between 5 and 10,000 Hz. At critical damping each of the trains from the generator produces a discharge in the form of a single pulse lasting 100 nanoseconds. The peak current can reach a value of the order of 10 A in one or other direction.

The ions supplied by the discharges occuring between electrodes a and c form an ion beam which is shown schematically in FIG. 1 by line 32. These ions are extracted from cage 16 via an orifice 34 and are directed through a system 36–38 of two slits connected to earth, the latter being the object slit 38 of the spectograph. In the case illustrated in FIG. 1 the spectrograph comprises a deflecting electrode 40 which is an ion beam suppressor plate.

This construction forms part of the prior art. However, according to the invention the apparatus also comprises means which make it possible to direct only those ions produced by discharges having a given direction towards the spectrograph. In the variant illustrated in FIG. 1 these means comprise a probe 44 which is sensitive to the current circulating in the discharge circuit. This probe is connected to a discharge direction selector 46 which supplies an electrical voltage whose polarity is invariable to one output $S_1$ or $S_3$, depending on the direction of the detected current. $S_2$ supplies a signal, no matter what the direction. One of the outputs $S_1$ or $S_3$ is connected to a pulse shaper 48 which supplies a rectangular pulse 50, whose function is to return to zero polarisation voltage which is applied to the suppressor plate 40 of the spectrograph via circuit 52. Thus, this pulse has a negative amplitude when the discharge between electrodes a and c has the desired direction and a zero value in the opposite case. In this case the ion beam 32 emitted by ion source 12 is not deflected when the discharge has the desired direction but is deflected by the suppressor plate 40 when a zero voltage is applied thereto, that is to say when the discharge does not have the desired direction.

Preferably, because the ion current has a greater intensity, the direction chosen is that which makes electrode a, brought to the acceleration potential serve as the anode.

For information purposes the amplitude of the signal supplied by the discharge direction selector circuit 46 can be between approximately 500 mV and approximately 3 V, whereby the square wave signal supplied by pulse shaper 48 can have an amplitude of a few volts and the square wave voltage 54 supplied by circuit 52 can have an amplitude of approximately 250 V.

Probe 54 can for example be a probe marketed under the trade mark Tektronix reference CT1/P 60-40, adapted by modifying the toroidal core connection to ensure a better electrical insulation, preventing the saturation of the magnetic circuit.

Figure 2:
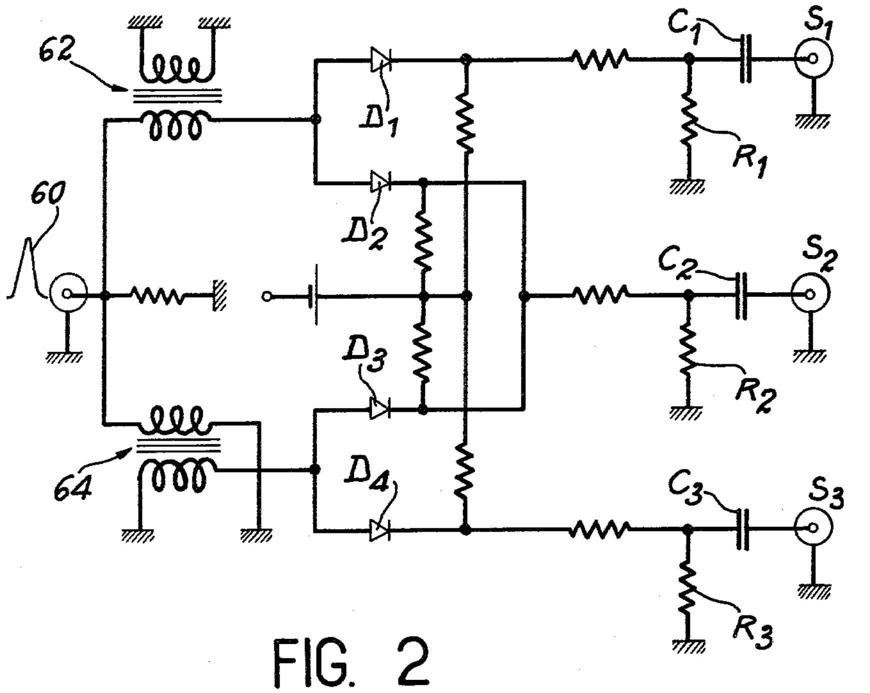
FIG. 2 is a discharge direction selecting circuit diagram.

The discharge direction selector circuit 46 does not constitute a problem to the skilled expert and can in particular be in accordance with the diagram FIG. 2. In this diagram the electrical signal 60 of random polarity is transmitted either directly or after inversion by means of transformer 64 to a system of diodes $D_1$, $D_2$, $D_3$, $D_4$ which select the direction of this signal. Connections $R_1C_1$, $R_2C_2$, $R_3C_3$ connect the three branches of the circuit to coaxial lines $S_1$, $S_2$, $S_3$.

For information purposes the diodes can be of the type 1N41-48, whereby the RC systems can comprise a resistance of 2.7 Ohms and a capacitor of 47 nF.

The circuit of FIG. 2 supplies a voltage pulse on one or other of the coaxial lines depending on the direction of the discharge current. The pulse carried by the coaxial line used does not have a rectangular shape so that, following application to the suppressor plate of the spectrograph it must be shaped. This operation is carried out by circuit 48 in FIG. 1 which does not constitute a problem for the skilled expert. Optionally this circuit can simultaneously fulfil an amplitude band selection function which permits an overall improvement in the performance of the apparatus.

The pulse shaper then supplies a square wave pulse 50, but as this pulse generally has low amplitude it must be transformed into a high voltage pulse which can control the supressor plate. This function is fulfilled by circuit 52, whereof a possible diagram is shown in FIG. 3.

Figure 3:
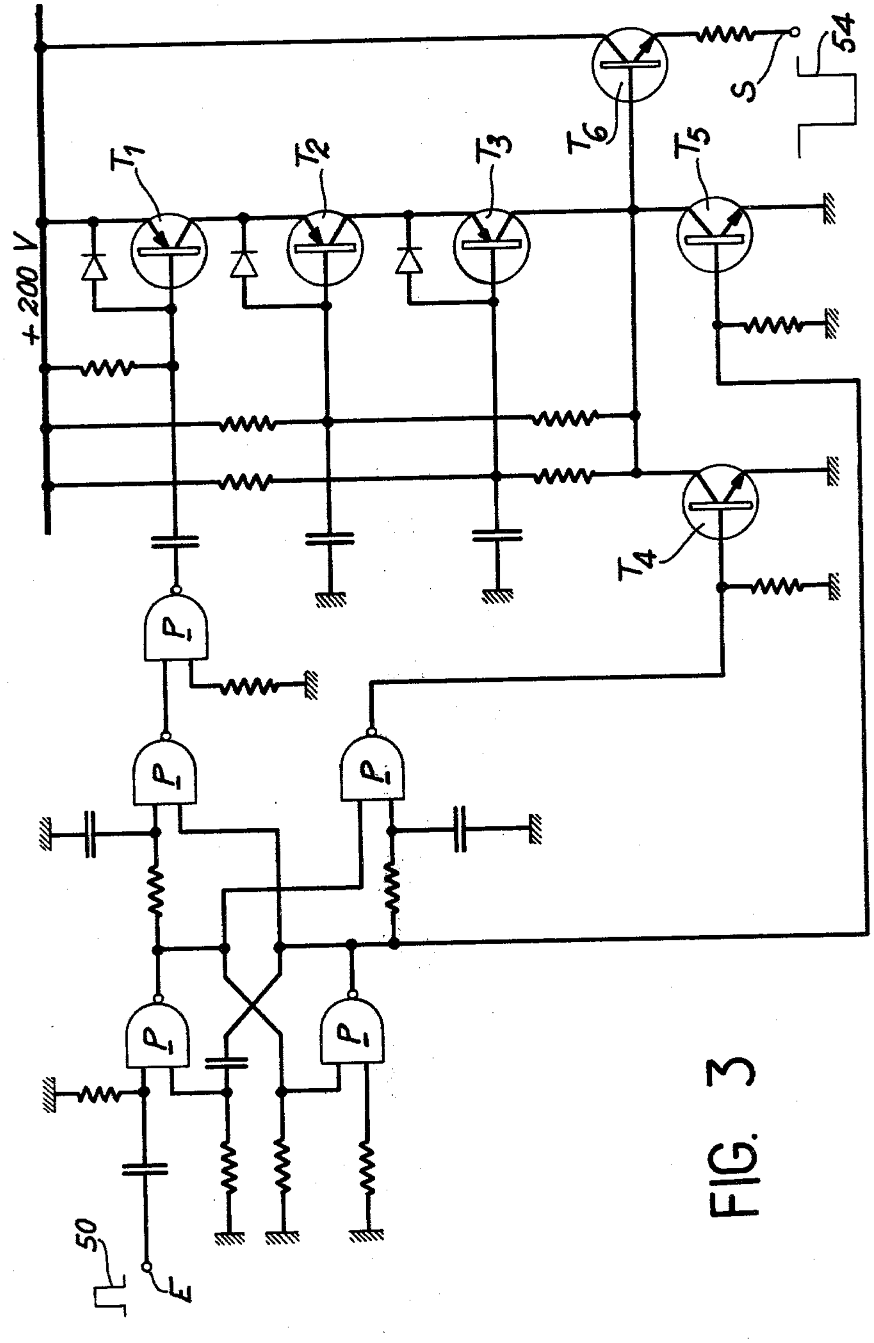
FIG. 3 is a ion beam passage control circuit diagram.

In FIG. 3 pulse 50 of for example an amplitude of 4 V is applied to the input E of the circuit which comprises logic gates of the N0-AND type (which can for example be of the SN 7402 type) and transistors $T_1,T_2,T_3$ (which can be of the 2N 5680 type) and transistors $T_4,T_5,T_6$ (which can be of the BF 259 type). A signal 54 appears at output S whereby said signal is at zero level when signal 50 exists and which is at non-zero (for example 250 V) when signal 50 is at zero level.

It results from the functions of the discharge direction selector circuit of FIG. 2 and of the circuit of FIG. 3 that if the discharge has the desired direction voltage 54 remains at zero level during a predetermined time, in such a way that the ion beam is not deflected by the suppressor plate. However, when the discharge direction is the opposite to the desired direction voltage 54 has a high positive value which brings about the deflection of the ion beam which represents the sought result.

According to a second variant of the apparatus according to the invention an electrical excitation is applied to the electrodes which is such that the discharges no longer occur in both directions as in the variant described hereinbefore but only in a single direction. The diagram corresponding to this second variant is shown in FIG. 4.

Figure 4:
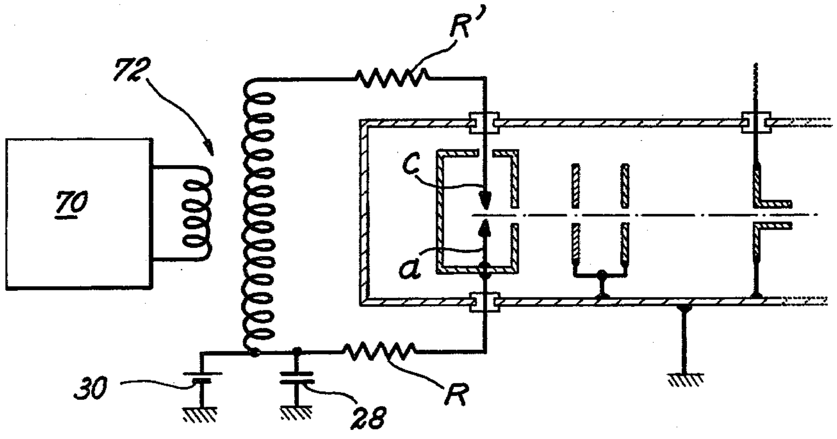
FIG. 4 is a schematic diagram of the apparatus according to the invention in the second variant.

In FIG. 4 a unipolar generator 70 excites the primary of a transformer 72, whose secondary is connected via resistors R′ to electrodes a and c of the ion source. The unipolar excitation generator 70 imposes the discharge current direction. The electrical characteristics of the discharge circuit constituted by the secondary of transformer 72, the resistors R′ and the electrode spacing are regulated in such a way no alternating discharge is obtained. Preferably the values given to the various components of this circuit are such that the system corresponds to critical damping. Under these conditions the discharge current assumes the shape of a unipolar pulse of given direction. The selection means shown in FIG. 1 and comprising assembly 44-46-48-52 then become unnecessary, except for checking the amplitude and the discharge appearance time. Voltage generator 70 is known to the skilled expert and the characteristics of the current pulse obtained with a discharge circuit having critical damping have been described in the article hereinbefore mentioned to which reference should be made. However, differing from said article the present apparatus makes it possible to select the direction of the current pulse which remains the same during sparking.

The invention is not limited to the embodiments described and represented hereinbefore, various modifications can be made thereto without passing beyond the scope of the invention.

What is claimed is:

1. A spark source mass spectrographic analysis process of the type in which ions are produced by means of sparking discharges between two electrodes, the ions produced being directed towards a mass spectrograph where spectrography is performed, wherein the direction of each discharge is detected, the ions are directed towards the mass spectrograph where they are analysed when the discharge has a desired direction but are deflected away and are not analysed when the discharge does not have said desired direction.

2. A process according to claim 1 wherein for the analysis of ions resulting from discharges with the desired direction a spectrograph is used which is equipped with a suppressor plate, a deflecting voltage pulse is formed for the duration of the discharges not having the desired direction and said pulse is supplied through said suppressor plate.

3. A process according to claim 1 wherein one of the two electrodes of the ion source is brought to a continuous acceleration potential, whereby the direction of the discharges selected for carrying out spectrography is that making said electrode serve as the anode.

4. A process according to claim 1 wherein for detecting the direction of the discharges the direction of the current in the discharge circuit is detected.

5. A spark source mass spectrographic analysis which comprises an ion source having two electrodes connected to electrical excitation means permitting discharges to be produced between them, means for directing the ions formed in said source to a mass spectrograph, and means permitting the spectrograph to analyse only the ions produced by the discharges having a given direction comprising discrimination means which comprise discharge direction detection means able to supply a voltage which is applied to an ion beam deflecting electrode, whereby said voltage is such that the electrode deflects the ions resulting from discharges which do not have the desired direction.

6. An apparatus according to claim 5 wherein the discharge direction detection means comprise a probe which is sensitive to the current circulating in the discharge circuit and a detection circuit of the direction of said current.

7. An apparatus according to claim 5 wherein said voltage applied to the deflecting electrode is zero when the discharge has the desired direction and positive in the opposite case.

8. An apparatus according to claim 5 wherein that said spectrograph comprises a suppressor plate, whereby said deflecting electrode is said suppressor plate.

* * * * *